United States Patent
Allwörden et al.

[11] Patent Number: 5,752,374
[45] Date of Patent: May 19, 1998

[54] AGRICULTURAL MACHINE, IN PARTICULAR SELF-PROPELLED LARGE BALER

[75] Inventors: Wilhelm Von Allwörden, Oberstotzingen; Dietrich Zaps, Rösath, both of Germany

[73] Assignee: Same S.p.A., Treviglio, Italy

[21] Appl. No.: 545,630

[22] PCT Filed: May 3, 1994

[86] PCT No.: PCT/EP94/01402

§ 371 Date: Jul. 1, 1996

§ 102(e) Date: Jul. 1, 1996

[87] PCT Pub. No.: WO94/24845

PCT Pub. Date: Nov. 10, 1994

[30] Foreign Application Priority Data

May 5, 1993 [DE] Germany .................. 43 14 569.8
Sep. 1, 1993 [DE] Germany .................. 43 29 469.3
Nov. 29, 1993 [DE] Germany .................. 43 40 639.4

[51] Int. Cl.[6] .................................................. A01F 15/04

[52] U.S. Cl. .................. 056/341; 56/343; 56/432; 56/16.4 R; 100/88

[58] Field of Search .................. 56/341, 343, 432, 56/436, 437, 10.2 R, 10.2 D, 16.4 R; 100/88, 89

[56] References Cited

FOREIGN PATENT DOCUMENTS 4227194  8/1992  Germany .

*Primary Examiner*—Terry Lee Melius
*Attorney, Agent, or Firm*—Hardaway Law Firm P.A.; Charles L. Schwab

[57] ABSTRACT

A self propelled baler includes a front pick-up device (10), a forward mounted cab (4), and engine (5) behind the cab and above a drive mechanism for the baler ram reciprocatable in a baling chamber. The crop picked up by the pick-up device is conveyed by a conveying device (20), positioned between the front drive wheels, rearwardly to a feeding device (30) which feeds the crop upwardly into the baling chamber.

38 Claims, 10 Drawing Sheets

AGRICULTURAL MACHINE, IN PARTICULAR SELF-PROPELLED LARGE BALER

TECHNICAL FIELD

This invention concerns an agricultural baler of the type having a crop pick-up device at its front end.

BACKGROUND AND INFORMATION DISCLOSURE STATEMENT

Agricultural balers are known which have at least a pick-up conveyor as well as a processing device, wherein the quantity of harvested crop picked up by the pick-up device is fed by a conveyor device to the processing device, and then to a delivery device. Such agricultural machines do not have an independent power drive so that it is necessary to attach them to a pulling vehicle, for example a tractor. The various components of the agricultural baler are driven by a power take-off from the tractor, thereby complicating the operation thereof. Because the power is transmitted from the power take-off of the tractor to the baler, power and energy losses occur. In addition, the operation of the tractor drawn baler is complicated both during the operation in the field and on the road due to its length. The utilization of such a unit on inclines is likewise limited.

U.S. Pat. No. 2,834,177, describes an agricultural machine having a conveyor device mounted beside the machine, such that the feed is transversal rather than longitudinal. Thus, the harvested crop is picked up beside the machine, fed transverse to the direction of travel into the processing device, in which case the inlet of the processing device is on the side of the machine. The resulting width of the machine complicates the maneuverability thereof and there is a danger that the harvested crop lying on the field may be run over by the wheels of the machine. The machine of U.S. Pat. No. 3,006,207 is similar to that shown in U.S. Pat. No. 2,834,177.

French patent document 2 224 288 describes an agricultural machine which has a pick-up, conveyor and a processing device, whereby a quantity of harvested crop is picked up on the pick-up device and is fed by the conveyor device to the processing device. The harvested crop is then passed through a delivery device. The vehicle is self-propelled, having its own power drive, and the processing device is a baler for forming large bales from a quantity of harvested crop. The baler has at least one bale chamber as well as baling and conveying elements. The machine, designed as a vehicle, has at least one front wheel assembly and one rear wheel assembly, with one wheel assembly driven and the same or the other wheel assembly steerable. In the French patent document 2 224 288, the conveyor device is in front of the front wheel assembly and arranged almost vertically in order to feed the harvested crop to the processing device in an upper area of the machine. With such a conveyor device, a height component has to be factored in since the opening for the processing device is at the upper end of the vehicle.

OBJECTS AND SUMMARY OF THE INVENTION

The object of the present invention is to provide an agricultural machine that operates economically, in particular on large scale farms. It is a further object to provide a machine that can be handled effectively during operation and avoids the herein before mentioned disadvantages of prior art balers and wherein the over-all productivity is increased and the cost of baler production is reduced.

In the present invention the pick-up device, the conveyor and the processing devices are integrated into a self-propelled and steerable vehicle which is easily controlled by the operator and produces large bales in a cost effective manner. Due to the resulting dimensions of the vehicle, it is particularly suitable for use on large scale farms.

According to the invention the processing device is designed to form large bales from a quantity of harvested crop. These large bales have essentially a circular cross section (round bales) or an essentially rectangular (square bales) cross section. The processing device of the vehicle is designed such that the large bales maintain their shape by means of rope, wire, netting, plastic film or alternatively by the baling operation alone.

Furthermore, according to a further aspect of the present invention, the machine designed as an automotive vehicle, has at least one front wheel and one rear wheel assembly with the front wheel assembly in the direction of travel, being driven while the rear wheel assembly is steerable. Alternatively, it is possible to steer as well as drive one wheel assembly while it is likewise contemplated to provide a four-wheel drive as well as four-wheel steering.

In a further development of the invention, the vehicle has a drive position which is arranged in such a way that at least the take-up device, seen in the direction of travel of the vehicle, is in the field of vision of an operator. In this way, an optimal command of the vehicle is ensured. The essential control elements are arranged at the operator position, including the controls for the various devices mentioned above. In addition to the steering and speed control elements, which are required to control the vehicle, it is of advantage to have the harvested crop handling devices of the vehicle capable of being adjusted and varied directly from the operator's position. The adjustment of the amount of pressure applied, or the operating speed of the pick-up or the conveyor device, is, for example, mentioned as examples of essential control elements for the baler.

In a further development of the invention, the power drive is hydrostatically controlled, in which case a hydrostatic device is arranged directly on an internal combustion engine of the vehicle. The use of a hydrostatic device provides that a stepless change of speed is simply achieved. In addition to the hydrostatic device, a transmission can be provided with which a further speed range (forwards and/or rearwards) can be realized.

In a further development of the invention, at least the baler can be driven partially by the internal combustion engine by means of transmission elements. This embodiment will be discussed in detail in the description of the drawings. Alternatively, it is contemplated that at least the baler (or some of its elements) can be driven at least partially and/or by electric motor. Thus, an alternative design for the drive of the devices of the vehicle is provided so that an optimal type of drive can be selected to drive each individual device or a combination of devices.

In a further development of the invention, the devices, in particular the pick-up conveyor, as well as the baler can be operated synchronously to one another and the drive can be controlled or steered as a function of the speed of the vehicle. This method of operation of the vehicle has the advantage that the vehicle can run over the field at any speed and can pick up a quantity of harvested crop so that the drive of the harvested crop handling devices is controlled or adjusted as a function of the speed. Thus an optimal operation of the vehicle is provided since the operator does not have to concentrate on the accumulating quantity of harvested crop. For this purpose, the harvested crop devices can be operated synchronously with one another. The individual conveyor or processing speeds of the devices are co-ordinated with one another so that a continuous flow of material of the harvested crop is ensured. It is contemplated that the devices may be operated by a single power drive in which case the devices will be connected to one another by transmission elements. Alternatively, it is possible that each individual device, or at least groups of devices, can be operated independently.

In a further development of the invention, it is provided that the speed of the vehicle can be controlled or adjusted as a function of operating parameters of at least one of the harvested crop handling devices. By assessing the operating parameters, i.e. quantity of harvested crop or amount of pressure applied, it is possible to intervene in the drive control of the vehicle (for example, speed control by means of the hydrostatic device) to control or adjust the speed of the vehicle and thereby to vary the speed, as a function of the accumulating quantity of harvested crop. Thus, it is contemplated that with a small accumulation of harvested quantity of crop, the speed of the vehicle may be higher than with a large quantity of harvested crop.

In a further development, the pick-up device has a width that at least corresponds to the width of the conveyor device. It is furthermore provided that the pick-up device extends at least beyond the exterior longitudinal outlines of the vehicle, even beyond the exterior outlines of a wheel assemblies. Thus the optimal pick up of harvested crop is ensured. Furthermore the chances of the harvested crop on the field being run over by the wheel assemblies of the vehicle is avoided. An embodiment of the pick-up device can be inferred from the description of the figures and in particular FIG. 3.

In a further development of the invention, at least one auger is mounted transversely between the pick-up and the conveyor device in such a way that the harvested crop, taken up by the pick-up device, is transported in the direction of the conveyor device. By using this auger, it is possible that a greater quantity of harvested crop such as several swaths lying next to each other can be taken up so that the harvesting capacity of the vehicle is clearly improved and the efficiency is increased.

In a further development of the invention, the pick-up is of multiple unit design in which case two exterior units are hinged, such that at least one unit is raised during road travel and set down during the pick-up operation.

In a further development of the invention, the conveyor device is a conveyor belt, floor scraper, and/or a conveyor tunnel. This has the advantage that there is an optimal feeding of the harvested crop in the direction of the processing device, without significant losses in the quantity of harvested crop or the chance of contamination arising.

In a further development of the invention, the conveyor tunnel is at least partially a storage space, spaced from the pick-up device. Alternatively, a separate storage space may be provided behind the conveyor device and in front of the processing device or the baler. These two alternative arrangements of a storage space have the advantage that in the case of an accumulation of the quantity of harvested crop, of the kind which exceeds the processing rate of the processing device, there is provided an intermediate storage facility. This is advantageous in the event that a large bale is being formed, and is being wrapped with a plastic film. This storage space is advantageous if the operator of the vehicle selects a speed which is so high that a continuous flow of the quantity of harvested crop might no longer be ensured.

In a further development of the invention, the pick-up device can be raised, automatically as a function of the ground conditions. In case the pick-up is of unitary design it can, by means of sensors which read the ground conditions, be automatically adapted to the latter. For road travel of the vehicle, the pick-up device can be raised. In case the pick-up device is of a multiple unit design, it is proposed that each unit of the pick-up device be provided with its own sensor to read the ground conditions so that each unit of the pick-up device can follow the contours of the ground. Efficiency is increased even when the ground conditions are uneven.

In a further embodiment of the present invention, the vehicle can be steered independently of the operator, as a function of the quantity of harvested crop on the ground. For this purpose, suitable sensors, such as image processing means that can follow swaths on the ground cause the vehicle to be driven independently as a function of this determined quantity of harvested crop by influencing the steering or the speed. Other sensors, which recognize an end of a swath or the border of the field, are required.

In a further development of the invention, it is provided alternatively, or in addition to the independent steering of the vehicle, that the vehicle can be steered by a satellite system, in particular a GPS system (Global Positioning System). In this case, it is possible that the vehicle, with or without operator, is driven, for example, on parallel tracks the width of which essentially corresponds to the width of the pick-up device, over the field on which the quantity of harvested crop is laid.

In a further development of the invention, the power drive of the baler originates from the internal combustion engine through a power transmission device. The power transmission device of the conveyor device and/or of the pick-up must be connected subsequent to the power transmission device of the baler. This arrangement of the drive has the advantage that the baler is in continuous operation and thus is constantly able to process harvested crop taken up by the pick-up device, and the latter can be switched on as needed. This can be witnessed when the machine is used in a field having at least two swaths, lying next to each other. The pick-up device may be switched off at the end of the field but the baler remains in continuous operation since there is still remaining harvested crop in the pick-up and conveyor devices.

In a further development of the invention, there is a transmission between the internal combustion engine and the baler and/or between the baler and the pick-up device. This has the advantage that various operating speeds can be set by means of the transmission. In addition, it is possible to switch on and off the power drive of the baler and/or the power drive of the pick-up device by means of the transmission.

Moreover, it is advantageous that the power transmission device include an idle option. This is particularly so when, in a further embodiment of the invention, the power drive of the baler, in particular the drive of the conveyor device connected with it, is provided with a reverse feature. The reverse feature has the advantage that in case there is a blockage during the pick-up or the processing of the harvested crop, the blockage can be removed by a brief actuation of the reverse feature. Contaminants such as stones can likewise be discharged. For this purpose, the power transmission of the conveyor device and/or the power transmission of the baler or the pick-up device is provided with an idle option.

In a further development of the invention, the front wheel assembly is a U-shape design, in which case the conveyor device is mounted in the interior of the U-shaped area and the wheels are at the ends of the legs of the U-shaped structure. In this case the power drive to the wheel is through the transmission elements i.e., gears and/or Cardan shafts. In a particular further development of the invention, the front wheel assemblies each have a hydraulic motor that is placed beside the conveyor device and act on a wheel. Thus the hydraulic motors are arranged by means of links to a base frame for the baler.

In a further embodiment of the invention, the pick-up device is at least of a two unit design with the drive of the pick-up device crossing from the transmission on both sides of the conveyor device to the two ends of the pick-up device. These embodiments are shown in the Figures and described in detail. By means of a segregated control of the hydraulic motors, steering can be realized in addition to that resulting from the steerable rear wheel assembly.

In a further development of the invention, the single or multiple unit pick-up device can be raised automatically as a function of the ground conditions. In case the pick-up device is of a single unit design, sensors which read the ground conditions, can be automatically adapted to the latter. At least one hydraulic cylinder is provided between the pick-up device and a link for the raising and for the adaptation to uneven ground conditions. At least one other hydraulic cylinder is provided for the transverse pivoting of the pick-up device. For road travel of the vehicle, the pick-up device can be raised. When the pick-up is of a multiple unit design, it is contemplated that each of the pick-up units will be assigned a sensor of its own to read the ground conditions so that each unit of the pick-up device can follow the contours of the ground. This increases the efficiency in the case of uneven ground conditions.

Moreover, it is contemplated that the pick-up device may be designed as a harvester or a harvesting accessory mounted to the pick-up device to harvest the crop. In this way, it is possible to harvest crops of grass, alfalfa, corn or elephant grass in the field and to process it directly into large bales. It is also possible to take up a crop such as straw and hay which is already harvested and lying in the field by means of the pick-up device and subject it to another cutting process, for example chaff cutting, and then to package it into a large bale covered by a plastic film.

BRIEF DESCRIPTION OF THE DRAWINGS

Other design embodiments and detail solutions of the agricultural machine according to the invention are described in detail in the following and shown in the Figures. The individual Figures show.

DETAILED DESCRIPTION OF THE DRAWINGS

Figure 1:
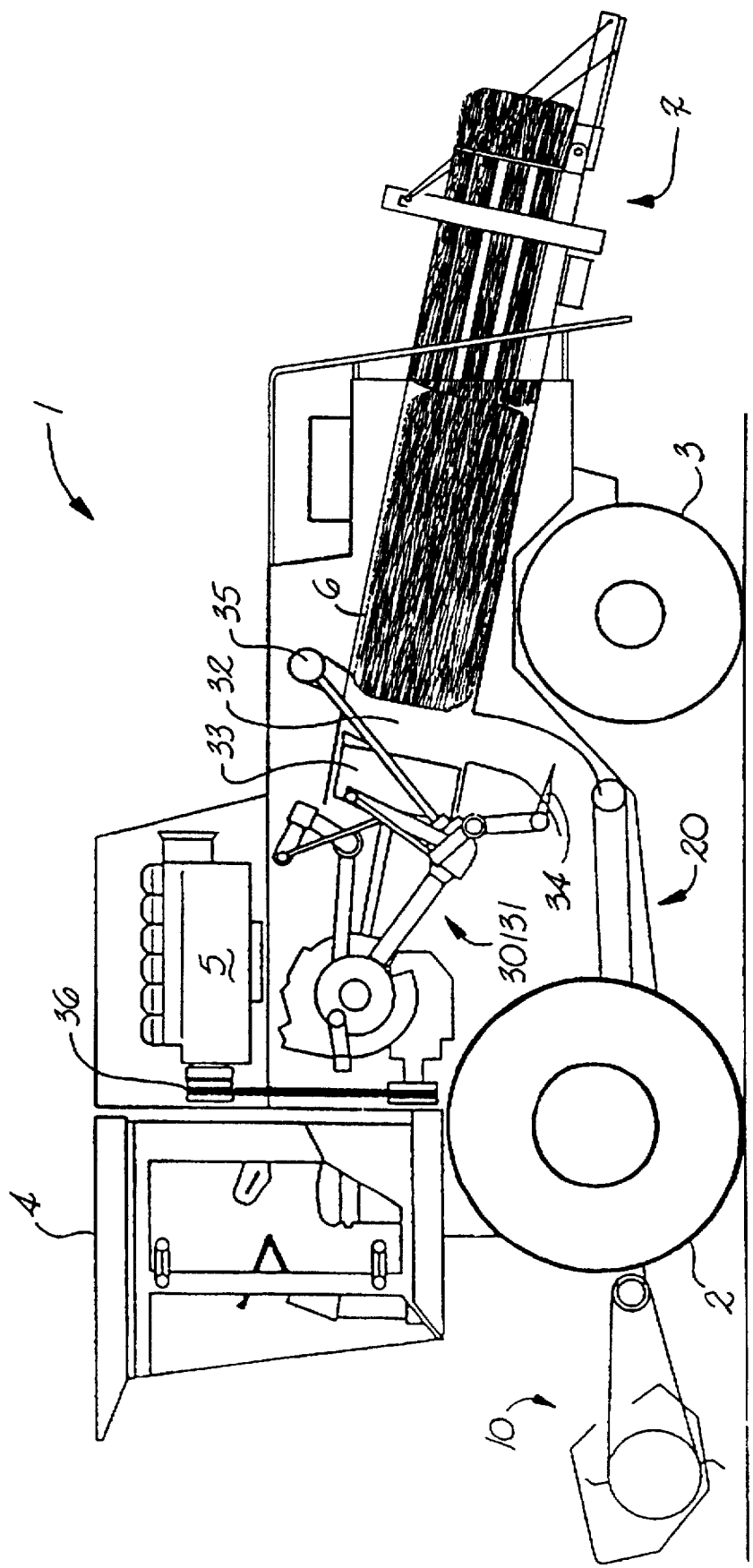
FIG. 1: An agricultural machine embodied according to the invention.

FIG. 1 shows an embodiment of the agricultural machine according to the invention. The agricultural machine, embodied according to the invention, is a vehicle 1 which has at least one front wheel assembly 2 and one rear wheel assembly 3. The vehicle 1 shown in FIG. 1 is a self-propelled large baler which presses, for example, large rectangular bales 6 from cut and dried green fodder or grass or straw. For this purpose, the vehicle 1 is equipped with a cab 4, which is shown in FIG. 1 as an enclosed driver's cab. Furthermore, in the vehicle 1 an internal combustion engine 5 is arranged which at least serves to drive the vehicle 1, using a hydrostatic device (not shown). For this purpose, it is provided in a particular embodiment that the front wheel assembly 2 is driven and the rear wheel assembly 3 steered.

Figure 3:
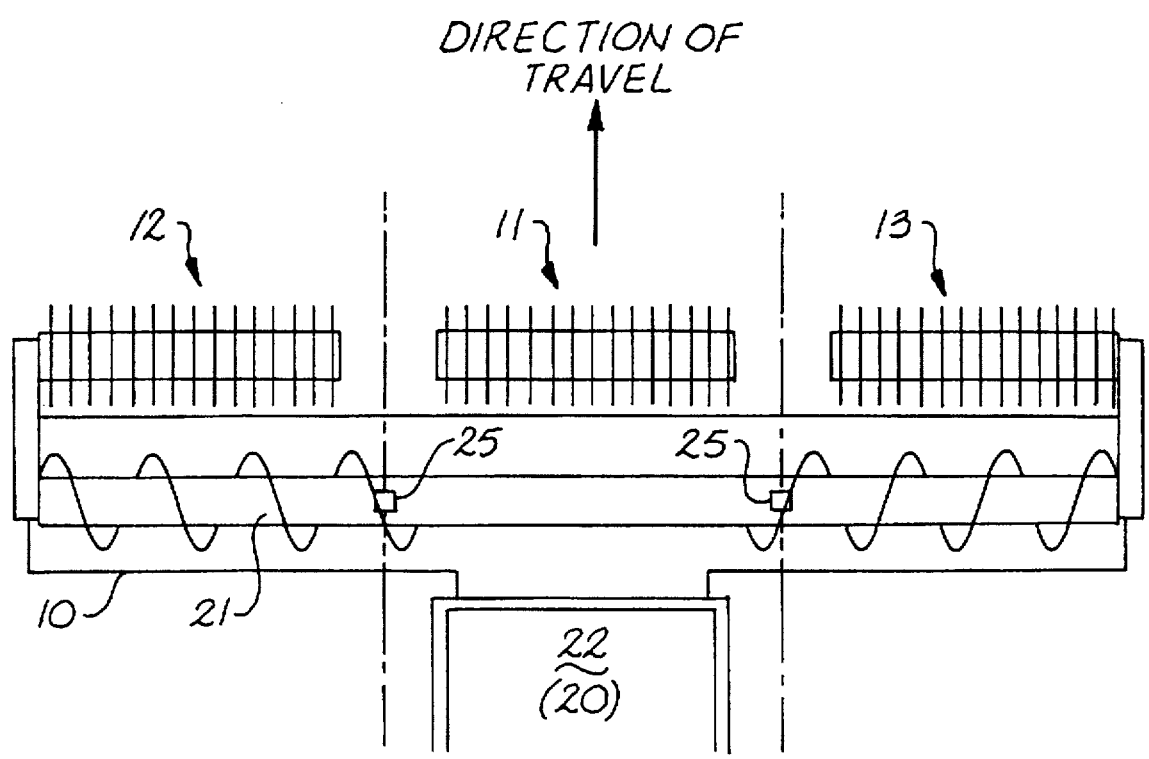
FIG. 3: Embodiments with regard to the pick-up and the conveyor device respectively.

The vehicle 1, moreover, has a crop receiving device in the form of a pick-up device 10, a conveyor device 20, a processing device 30 as well as a delivery device 7 at the rear of the vehicle 1. The pick-up device 10 is shown in FIG. 3. The pick-up device 10, which for road travel is raised, is adjoined to the conveyor device 20 to feed the fodder of the harvested crop, taken up by the pick-up device 10, to the processing device 30. Alternatively to this embodiment, the processing device 30 may be connected directly to the pick-up device 10 (by dispensing with the conveyor device 20).

The processing device 30 is in this case essentially a baler 31 which has a bale chamber 32 in which baling elements 33 (ram-like designed pistons) press the harvested crop which is transported via conveyor elements 34 to the bale chamber 32. A tying device 35 is designated which holds together the pressed large bales during the baling operation and ties the large bales after termination of the pressing operation. A wrapping device (not shown) may replace the tying device in order to wrap the large bales with a netting or a plastic film. In another embodiment of the invention, the drive of the processing device 30 or the baler 31 is taken directly from the internal combustion engine 5 via a V-belt 36. Instead of the V-belt 36, other suitable transmission elements such as a chain, is possible. An independent drive of the processing device 30 is likewise contemplated.

Figure 2:
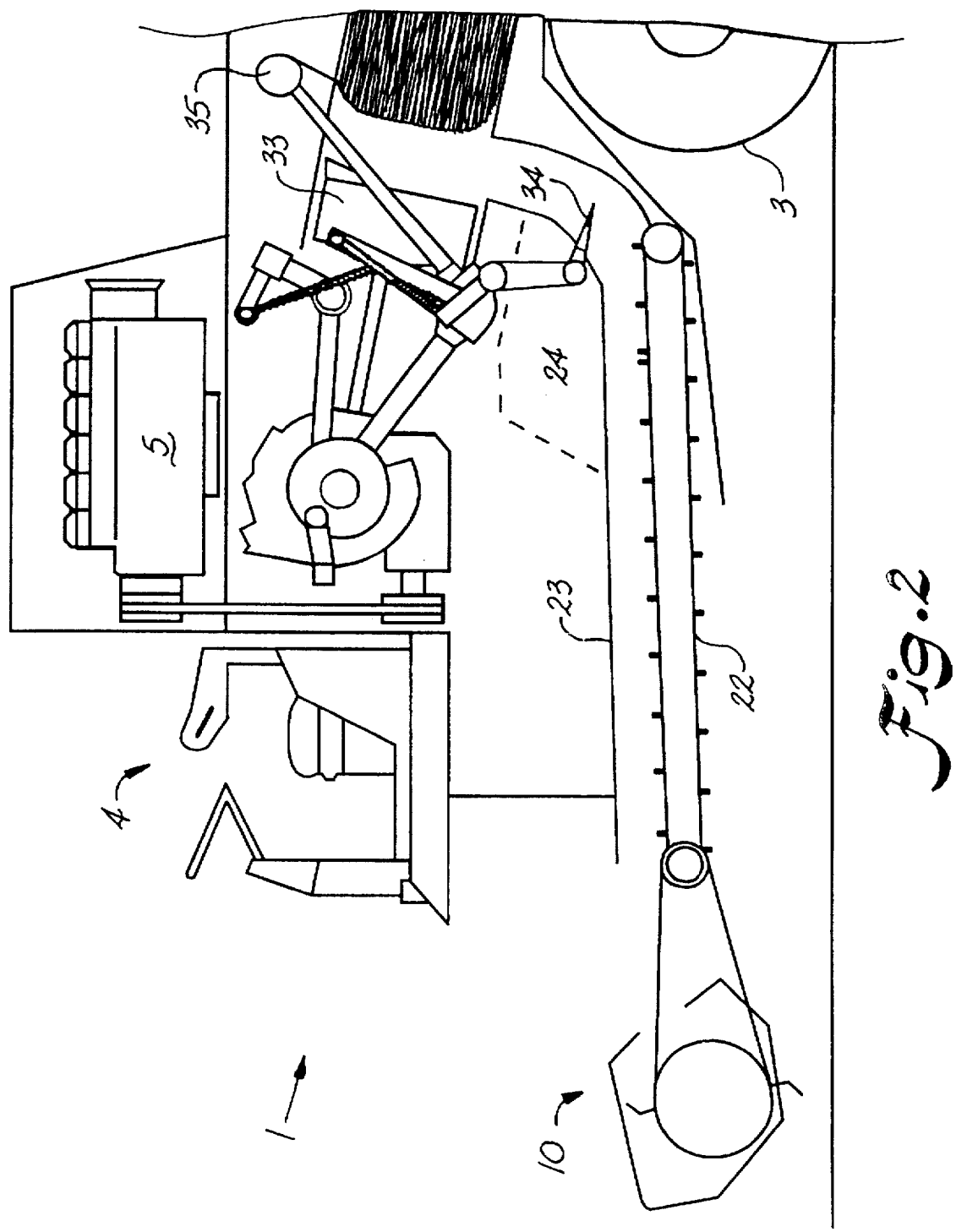
FIG. 2: Detail embodiments with respect to the machine according to the invention.

FIG. 2 shows detail embodiments with respect to the agricultural machine according to the invention.

In addition to the components shown in FIG. 1 and provided with the same reference numbers, FIG. 2 shows a conveyor belt 22 of the conveyor device 20 that transports the harvested crop, taken up by the pick-up device 10, in the direction of the processing device 30. In a particular embodiment of the invention, this conveyor belt 22 is designed as floor scraper. In another embodiment, the conveyor belt is in a conveyor tunnel 23 which channels the crop in the direction of the processing device 30 and protects against contaminants. At the same time, this conveyor tunnel 23 serves as a storage space in case more harvested crop is taken up by the pick-up device 10 than can be processed by the processing device 30. In addition to or alternatively to the conveyor tunnel 23 as storage space a separate storage space 24 (represented by a broken line) is provided in an area spaced from the pick-up device 10 and upstream from the processing device 30. The storage space 24, analogous to the conveyor tunnel 23, can store surplus quantities of crop which can then be transported to the processing device 30 when processing is ensured. For this purpose it is, for example, possible to drive the conveyor paddles 34 independent of the baler 31 or independent of the ram 33 so that these conveyor paddles 34 operate only when the crop can be transported to the bale chamber 32. In case a storage space 24 is available, it is contemplated for example, to let the drive of the pick-up device 10 and the conveyor device 20 respectively run continuously as a function of the speed of the vehicle 1, or independent thereof, and to vary the speed of the conveyor paddles 34 and the ram 33 respectively as a function of the quantity of crop, present in the storage space 34 and the quantity of crop present in the bale chamber 32.

The cab 4 shown in FIG. 2 is open compared to the cab shown in FIG. 1.

FIG. 3 shows embodiments with regard to the pick-up and conveyor device respectively.

The pick-up device 10, shown in FIG. 3, is a pick-up of multiple unit design divided into a center pick-up as well as two outer units 12 and 13. At least one auger 21 is arranged transversely, as seen in the direction of travel, between the pick-up 11 (including the two outer units 12 and 13 respectively) and the conveyor device 20 (before the front end of the conveyor belt 22 respectively). Thus the harvested crop taken up by the pick-up device 10 and the pick-up 11 12, and 13 respectively is transported in the direction of the conveyor device 20. To avoid an excess width of the vehicle 1 during road travel and to automatically adapt to the ground contours, the pick-up device 10 and the auger 21 respectively are of a multiple unit design, the two outer units 12 and 13 can be raised about hinges 25 (broken line). In the embodiment of FIG. 3, the drive of the pick-up 11, 12 and 13 is coupled with the auger 21 (for example, by a transmission not shown) and rotates at the same rotational speed. In a particular embodiment of the invention, this rotational speed is directly proportional to the speed of the vehicle 1. Not shown in FIG. 3 are sensors which read the ground conditions and raise the two outer parts 12 and 13, separately or jointly, in co-ordination with the center pick-up 11, or independently thereof.

Figure 4:
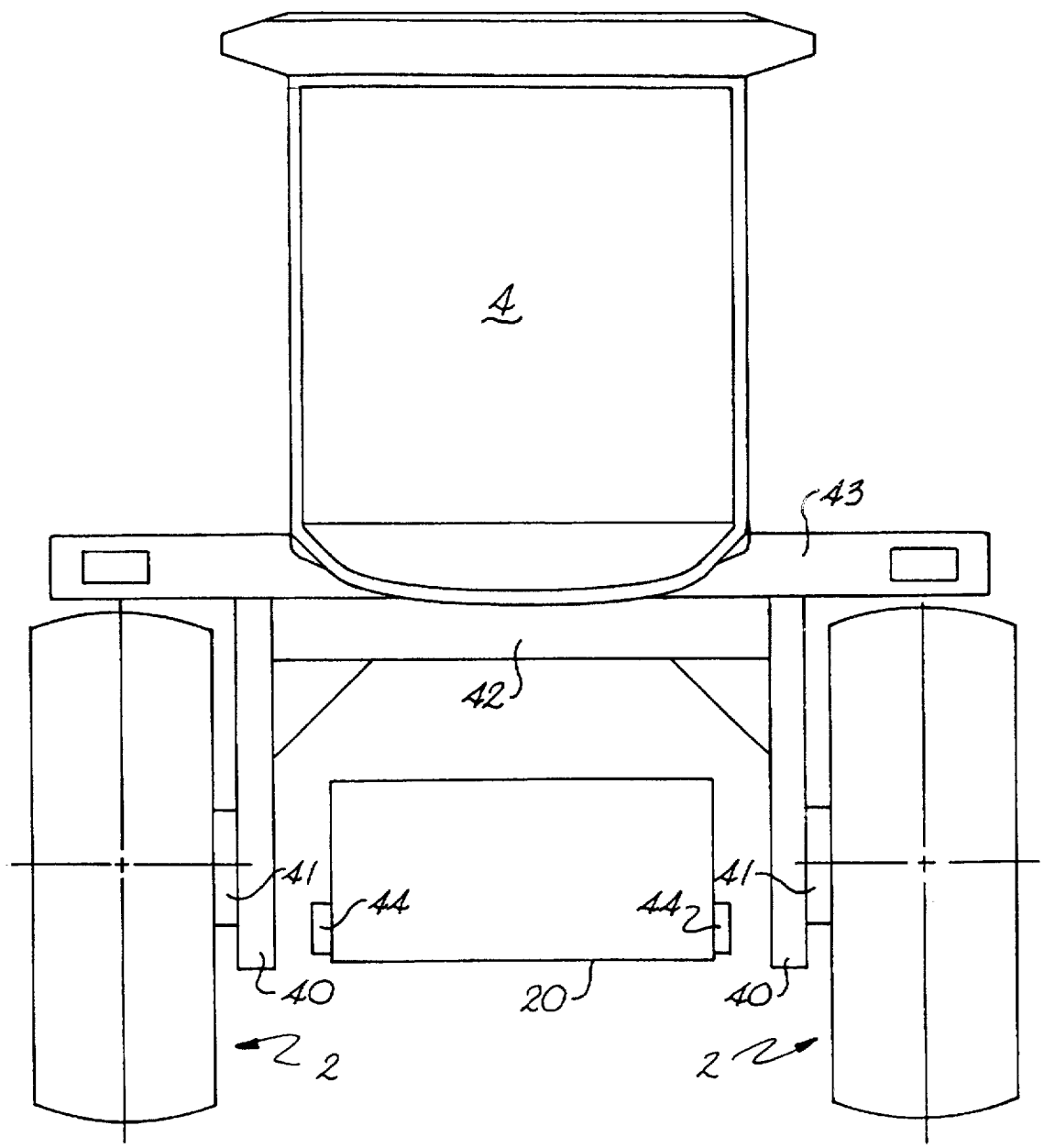
FIG. 4: Front view of an agricultural machine embodied according to the invention.

FIG. 4 shows the front view of an agricultural machine which does not represent any exemplified embodiment of the invention.

In addition to the components shown in the preceding Figures, the wheels of the front wheel assembly 2 are attached to a frame 42 via legs 40 (stationary or pivoted, in particular spring-suspended) through the intermediary of hydraulic motors 41 which act directly on the wheels or indirectly on the wheels through the intermediary of a transmission. This essentially U-shaped arrangement of the legs 40 and the frame 42 has the advantage that inside the U-shaped area, space is provided for the conveyor device 20 (conveyor tunnel). In this way, the conveyor tunnel has a low installation point permitting the entire agricultural machine to have a low profile and a low center of gravity.

It is contemplated to design the entire baler device as a complete unit so that the frame 42, including the legs 40, can be connected to a chassis of the baler (31), indicated in FIG. 4, and provided with the reference number 43. This has in particular functional advantages since the baler, designed as a unit, has only to be provided with components such as pick-up and conveyor devices and devices typical for vehicles. By means of this unit assembly technique, a cost efficient manufacturing of the agricultural machine according to the invention is provided. Reference number 44 designates attachment points for hydraulic cylinders which raise or lower the pick-up device 10.

Figure 5:
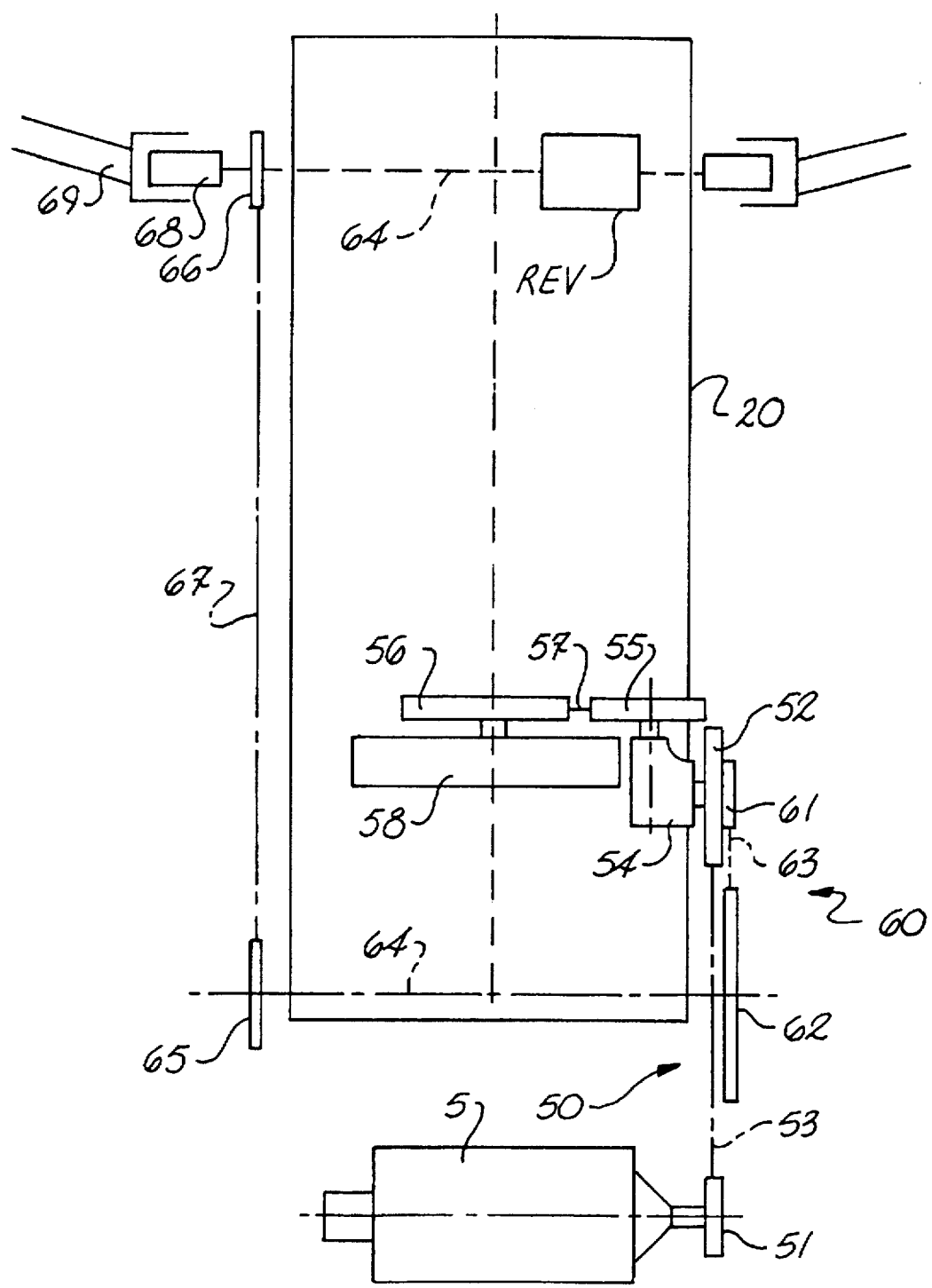
FIG. 5: Drive diagram of the baler and the pick-up device.

FIG. 5 shows a drive diagram of the baler and pick-up device.

Thus, a power drive for the baler 31 originates from the internal combustion engine 5, while the drive for the pick-up device 10 (and the pick-up 11 respectively) is downstream to the drive for the baler 31. A power transmission device 50 of the baler 31 consists in particular of two belt pulleys 51 and 52 connected by a belt 53. This transmission, formed by the belt pulleys 51 and 52 as well as by the belt 53, is of a simple design and makes possible an idling feature. A pressure pulley (not shown in FIG. 5) is assigned which, in the switched on state of the power transmission device 50, presses on the belt 53 and tenses the latter while, for the idling state, the pressure pulley is retracted thus removing the pressure.

Furthermore, a miter gear 54 is provided acting on other belt pulleys 55 and 56 (connected by a belt 57) and transfers the torque of the internal combustion engine 5 to a flywheel 58. This flywheel 58 then acts on the ram 33 and the conveyor paddles 34 respectively. Subsequent to the power transmission device 50 of the baler 31, there is a power transmission device 60 for the pick-up device 10 comprising belt pulleys 61 and 62 connected by a belt 63. This can likewise be provided with an idle feature (as described for 50).

Moreover, it is possible that the power transmission device 60 does not only act on the pick-up device 10, but also drives the conveyor device 20. For this purpose a shaft 64, acting on the conveyor device 20, is provided, at the ends of which the belt pulley 62 and another belt pulley 65 are mounted. The belt pulley 65 transfers the torque from the internal combustion engine 5 via a belt 67 to a belt pulley 66, which sits on another shaft 64 at the entry of the conveyor device 20. At the end of this shaft 64, power take-off stubs 68 are arranged which can be connected with transmission elements 69 (shaft including Cardan joint). These transmission elements 69 can drive the pick-up device 10 so that the drive of the pick-up device 10 takes place from a transmission and via the transmission elements along the conveyor device 20 to the two ends of the pick-up device 10. To realize the reversal of rotation, one of the two shafts 64 can, for example, be provided with a drive which can be switched on as needed for the reversal of rotation. In this case, for example, it is a device known in itself as it is known from passenger cars in the case of starting motors.

Figure 6:
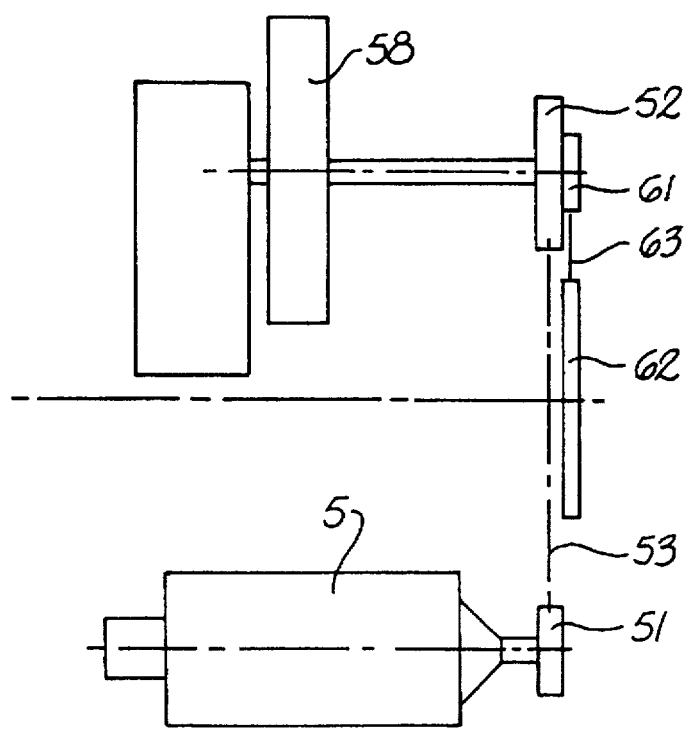
FIG. 6: An alternative drive diagram of the baler and pick-up device.

FIG. 6 shows an alternative drive diagram of the baler and pick-up device.

In this drive diagram, the flywheel 58 is driven directly by the belt pulley 61. This has the advantage that the miter gear 54 is eliminated so that a more cost efficient and functionally simpler variant is provided.

Figure 7:
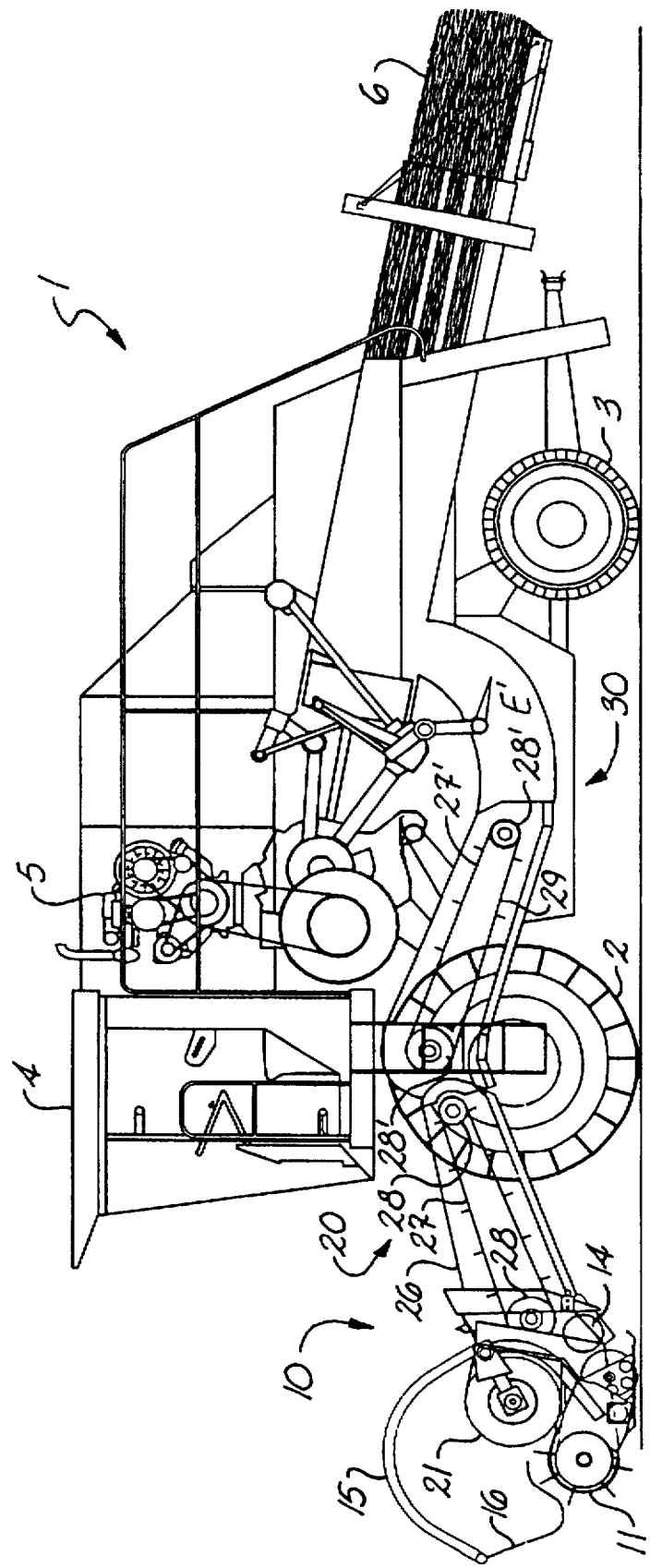
FIG. 7: Another self-propelled agricultural machine.

FIG. 7 shows another embodiment of the self-propelled agricultural machine.

In this embodiment according to the invention, there is arranged, in the area between the auger 21 and the entry of the conveyor device 20, a driven feeding device which, in a preferred embodiment of the invention, is a rotary cylinder or roller 14 which is arranged with its outer circumference close to the outer circumference of the auger 21 to support the supply of the harvested crop, transported by the auger 21 to the area of the conveyor device 20. This feeding device, designed as a roller, has the advantage that the supply of harvested crop is supported in the area of the conveyor device 20, improving the throughput capacity and avoiding blockages and accumulations respectively. In the embodiment, shown in this FIG. 7, the axes of the auger 21, the roller 14 and the roller of the conveyor belt 27 are at the apices of a triangle in which case an apex points in the direction of the ground and in this the axle of the roller 14 is arranged. It is furthermore possible to arrange the feeding device in the form of a rake driven by a cam so that the quantity of harvested crop, transported by the auger 21 to the area of the conveyor device 20, is transported rhythmically to the conveyor device 20.

As moreover shown in FIG. 7, there are arranged on the pick-up device 10, support elements 15, to the end of which down holders 16 are arranged which in particular can be spring-loaded. Because of the use of the down holders 16, in this case rods which have a spring action, the harvested crop, taken up by the pick-up 11, is channeled to the auger 21 so that in this way a uniform take-up and conveyance of the harvested crop is ensured via the pick-up 11 to the auger 21 and by this into the area of the conveyor device 20.

In a further development of the invention, the conveyor device 20 includes a tunnel 26 in which the conveyor belt 27 is arranged. In this case the tunnel 26 has a recess 18 to accommodate the roller 14 (see FIG. 8).

In another embodiment of the invention, a spring loaded roller 14 can be moved in such a way that the distance between the outer circumference of the roller and the outer circumference of the auger 21 (or also to the turning point of the conveyor belt 27) can be changed. This has the advantage that the roller 14 can yield in the case of an extremely large quantity of harvested crop, or also in the case of contaminants, so that the processing operation can go on unhindered. Furthermore, the roller 14 in another embodiment of the invention has on its outer circumference, at least in particular sectors, crossbars which are deformable. These crossbars can, for example, be welded-on sheets, rubber lips or brushes. Such crossbars are likewise arranged at least in a longitudinal center area of the auger 21, in particular in the area of the roller 14.

In a further development of the invention, the drive of the roller 14 takes place synchronously or a synchronously to the drive of the auger 21 and the conveyor belt 27 respectively. The synchronous drive has the advantage that a steady and uniform supply of harvested crop is ensured. In contrast to this, it is advantageous with the asynchronous drive that the flow, in particular when the drive of the feeding device is controlled as a function of the accumulated or taken up quantity of harvested crop, is made uniform in the case of a varying quantity of crop. In this connection, it is also contemplated to design the drive of at least some components of the pick-up 10 (for example, pick-up 11, auger 21 or roller 14) as a function of the traveling speed of the machine 1.

In FIG. 7 it is further shown that the conveyor device 20 may consist of at least two conveyor belts (27, 27') which each are guided over two rollers and arranged (seen in the longitudinal direction of the machine 1), in tandem, and the transfer from conveyor belt 27 to the other conveyor belt 27' is in an area of the reorientation point. This is an additional feature of the general inventive idea that a front wheel assembly has a transverse axle with wheels connected at its ends, in which case the transverse axle is at least connected with a differential as well as a hydraulic motor and brakes, and the conveyor device is arranged above the transverse axle in the longitudinal direction of the machine. This has the advantage that the transverse axle, which is a know product such as a structural part of harvester-thrashers, can be manufactured and installed at a low cost, in particular in the mass production of agricultural machines.

Figure 8:
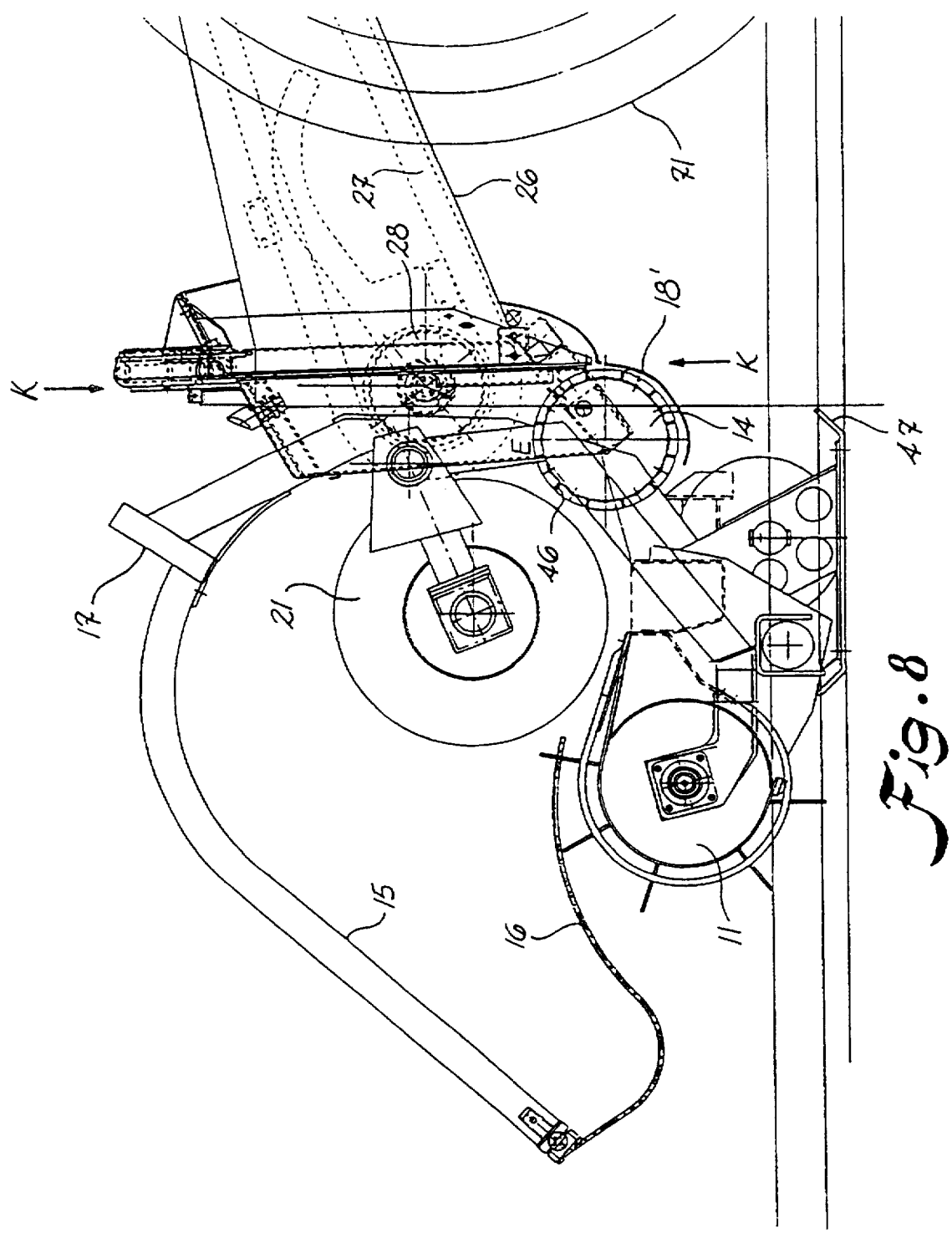
FIG. 8: Detail view of a pick-up device.

Since this low-cost transverse axle prevents a straight and continuous arrangement of the conveyor device 20 in the case where the processing device 30 is installed, as shown in FIG. 8, the conveyor device 20 is mounted in the longitudinal direction of the machine above the transverse axis. In order to achieve an as low as possible center of gravity of the machine, it is necessary to provide, due to the low-lying entry area E' of the processing device 30, a reorientation point in the conveyor device 20 so that the entry area E and the exit area A of the conveyor device 20 are essentially at one level and the conveyed harvested crop, because of the use of the reorientation point, is transported over the transverse axle.

In another embodiment of the invention, it is contemplated to have the reorientation point of the conveyor device in an area above the transverse axis but with the conveyor device 20 made up of a single conveyor belt, guided over at least three rollers, in which case a first roller of the conveyor device is arranged in the entry area, a second roller of the conveyor device in an area of the reorientation point as well as the at least third roller of the conveyor device in the exit area, to which the processing device is adjoined. Thus another embodiment for the realization of the conveyor device is provided.

In a further development of the invention, at least the segment of the conveyor device 20 connected to the pick-up device, is movable, in particular pivotable. For this purpose, in the two-belt arrangement of the conveyor device 20, the conveyor device 20 is pivoted about the axis of the rearmost of the two rollers 28 supporting the conveyor belt 27. The conveyor belt 27 and the tunnel 26 are pivotable about the axis of the roller 28. In the one-belt arrangement of the conveyor device 20, the segment of the conveyor device 20 extending forward from the part of the conveyor belt, extending from the roller near the reorientation point to the pick-up device 10, can be moved vertically, together with the tunnel in which it is housed. The vertical movability is in particular achieved by arranging the pick-up device 10 vertically movable by means of hydraulic cylinders, not shown in the Figures, which are attached to the transverse axle. These hydraulic cylinders are arranged in such a way that during road travel, the entire pick-up device 10 can be raised and during use in the field to take up harvested crop, the pick-up device 10 can be adapted to the ground and the ground irregularities by means of a control.

FIG. 8 shows a detail view of the pick-up device 10. Apart from the components shown in FIG. 7 and provided with the same reference numbers, a crossbar 17 is in addition shown, which is supported on the pick-up device (in particular on a not shown frame or on a shell) and to which the carrier members 15 are connected and mounting the holddowns rods 16. Furthermore, it can be inferred from this FIG. 8 that the pick-up device 10 is detachable along a coupling plane K. This is in particular of advantage when the pick-up 10 is of excessively wide design.

For this purpose, the tunnel 26 of the conveyor device 20 is also of separable design so that a first part of the recess 18, to accommodate the roller 14, is on the conveyor device 20 itself and a second part (18') is supported on the frame or the shell of the pick-up device 10. Furthermore, in FIG. 8 skids 47 are shown by which the pick-up device 10 is supported on the ground. These skids 47 can also be designed as sensor or contain a sensor which reads the irregularities of the ground and appropriately controls the hydraulic cylinders to compensate for the irregularities of the ground.

Figure 9:
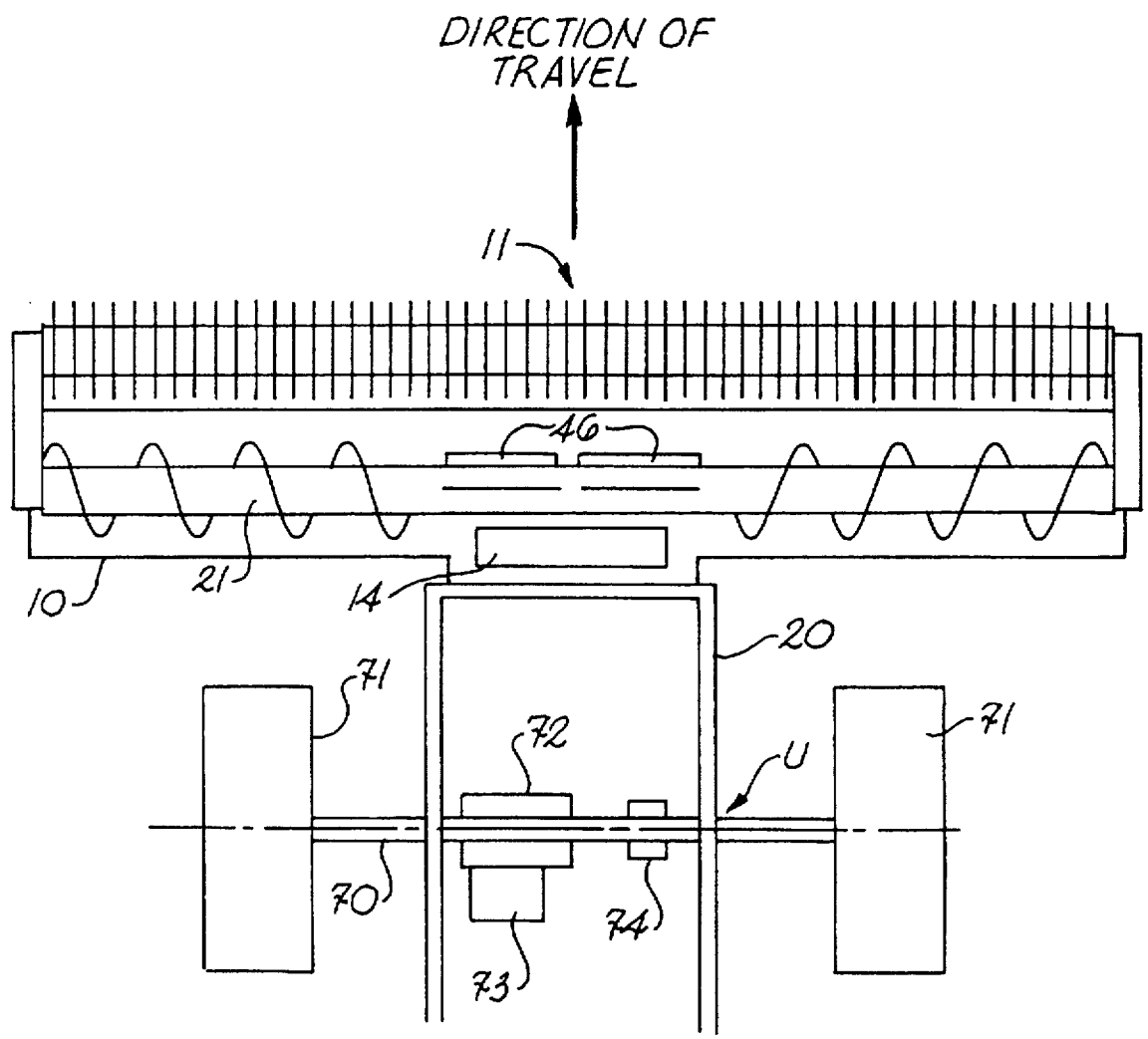
FIG. 9: Front top view of the agricultural machine.

FIG. 9 shows a front top view of the agricultural machine. The illustrated unitary pick-up 11, which exceeds the external outlines of the machine 1 is adjoining the auger 21, behind which the feeding device designed as roller 14 is arranged. The auger 21 (as shown), or also the roller 14 (not shown here), has on its outer circumference, at least in particular sectors, crossbars 46 which in particular are deformable. The roller 14 extends at least over a partial width of the conveyor device 20 (or conveyor belt 27), in which case the extension of the roller 14 over the total width of the conveyor device 20 may be advantageous. The conveyor device 20 includes the reorientation point U in an area of the transverse axle 70 to the ends of which the wheels 71 are arranged. The transverse axle 70 has furthermore a differential 72 (in particular with transmission), a hydraulic motor to drive the machine 1 as well as brakes 74. In a two-belt arrangement of the conveyor device 20, the first conveyor belt 27, seen in the direction of travel, is arranged before the transverse axle 70 and the other conveyor belt 27' behind the transverse axle 70. The reorientation point U can also be arranged in an area before or after the transverse axle 70.

Figure 10:
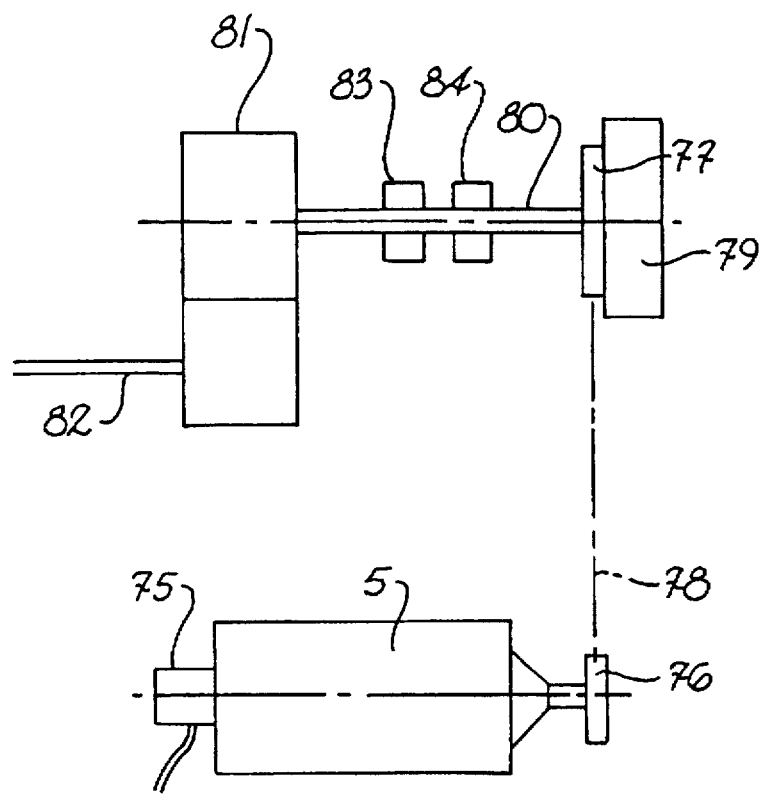
FIG. 10: An alternate drive for the baler of this invention.

FIG. 10 shows another drive diagram. Thus, according to the invention, it is provided that a flywheel 79, assigned to the processing device 30, is connected to an internal combustion engine 5 through a power transmission device, in particular consisting of the belt pulleys 76 and 77 which are connected to each other by the belt 78. The drive of the other elements, at least of the processing device 30, takes off from a shaft 80 connected to the flywheel 79. This arrangement requires a simple design and represents a reliable and simple drive diagram for the devices of the machine.

In a further development of the invention, another power transmission device is connected to the shaft 80 and at least one friction coupling 83 and/or shear coupling 84 is arranged between this power transmission device and the flywheel 79. As shown in FIG. 10, the drive for the flywheel 79 originates from the internal combustion engine 5, on which a hydrostatic device 75 is arranged for the hydraulic motor 73, by the belt pulleys 76 and 77 connected to each other by the belt 78. The shaft 80 is connected to the flywheel 79 which leads to the other power transmission device, in particular to a transmission 81. From the transmission 81, a drive shaft 82 leads to other devices of the machine, in which case the drive shaft 82 can have other belt drives. At the shaft 80, at least one friction coupling 83 and/or shear coupling 84 are arranged between the flywheel 79 and the transmission 81 which in particular take effect during overload or blockage of at least one device of the machine so that the drive is effectively protected and interruptions or damages are avoided.

It still has to be emphasized that the processing device is also designed to bale long-fiber materials such as, for example, cardboard or paper and the machine can be used for this purpose. For the purpose of this application, the pick-up device can, for example, be removed so that the conveyor device is directly accessible to directly feed the long-fiber materials. For this purpose, it is also possible to connect a storage bin instead of the pick-up device.

Furthermore, the conveyor belt 27 (and also the conveyor belt 27') can be designed as chain conveyor, in which case the rollers 28 and 28' are present at least in duplicate, in which case, around each roller pair 28, a chain revolves which is connected with the other chain of the other roller pair 28' by crossbars, which convey the harvested crop.

In addition, it must be emphasized that the machine embodied according to the invention, can be used to form essentially large, square-shaped bales as well as to form round bales. To form round bales, the processing device 30 and its baler elements 31 to 35 respectively have to be modified in an appropriate manner. The production of large, square-shaped bales represents a preferred embodiment. It is also contemplated to arrange, behind each unit of a multiple unit pick-up device, individual conveyor devices and adjoining individual processing devices so that, for example, with a single vehicle several large bales (or several small bales) can be formed next to one another. Also in the case of this arrangement, it is contemplated that, to each single pick-up, a auger is transversely assigned which channels the harvested crop, taken up by the individual pick-up unit, in the direction of the individual conveyor devices.

Furthermore, according to the invention the internal combustion engine 5 is provided in an area essentially above the conveyor device 20 or the processing device 30 and in an area essentially between the two wheel assemblies 2 and 3. In this way, the individual components are spaced close to each other so that expensive transmission elements can be eliminated and the baler 31 can be driven directly (as shown in FIG. 1 and FIG. 2) by a V-belt 36.

The cab 4, designed as an enclosed cabin, may be soundproofed and air-conditioned so that in this way the operating comfort of the vehicle 1 is increased. In particular from the combination of the FIGS. 1 and 3, it can be seen that from the driver position in cab 4 the operator has an unobstructed view of the complete pick-up device 10 (including the outside outlines of both the outside parts 12 and 13).

What is claimed is:

1. A self-propelled agricultural machine in the form of a steerable vehicle having longitudinally opposite front and rear ends and operable to receive and bale harvested material when driven in a forward direction of travel, said baler comprising:

a front wheel unit (2) including a pair of laterally spaced and ground engaging front wheels, a rear wheel assembly (3) at said rear end of said vehicle including at least one ground engaging wheel, an operator's cab (4) at said front end of said vehicle, a crop receiving device (10) at said front end of said vehicle, a baling device (30) disposed above said rear wheel assembly (3) and including a bale chamber (32) extending in the longitudinal direction of said vehicle and disposed rearwardly of said operator's cab (4) and a reciprocatable ram (33) in said bale chamber (32), a longitudinally extending conveyor device (20) operable to convey crop from said crop receiving device rearwardly between said ground engaging front wheels and upward to said bale chamber (32), said conveyor device being disposed below said operator's cab, and an internal combustion engine on said vehicle behind said operator's cab operable to drive said crop receiving device (10), said conveyor device (20), said baling device and said front ground engaging wheels.

2. The agricultural machine of claim 1, wherein said front wheel unit (2) includes a transverse axle (70) and wherein said conveyor device (20) passes above said transverse axle (70).

3. The agricultural machine of claim 2 and further comprising a hydrostatic transmission including a hydraulic pump (75) driven by said engine and at least on hydraulic motor connected in driving relation to said front wheels.

4. The agricultural machine of claim 1 wherein said internal combustion engine (5) drives said baling device (30) through a power transmission.

5. The agricultural machine of claim 4 wherein said power transmission is a hydrostatic transmission.

6. The agricultural machine of claim 1 wherein said internal combustion engine drives said crop receiving device, said conveyor device and said baling device in a synchronized manner and wherein the speed of said internal combustion engine is controlled as a function of the speed of the vehicle (1).

7. The agricultural machine of claim 1 wherein the speed of the vehicle (1) is controlled as a function of operating parameters at least of one of said receiving, conveying and baling devices (10, 20, 30).

8. The agricultural machine of claim 1 wherein said receiving device (10) is a rotary pick-up (11).

9. The agricultural machine of claim 1 wherein said receiving device (10) extends laterally beyond said front wheel unit.

10. The agricultural machine of claim 1 wherein said receiving device (10) is at least as wide as said conveyor device (20).

11. The agricultural machine of claim 10 and further comprising a transverse auger (21) disposed between said receiving device (10) and said conveyor device (20), said transverse auger (21) being operable to convey fodder received by said receiving device (10) laterally inward to said conveyor device (20).

12. The agricultural machine of claim 11 wherein said receiving device (10) extends laterally beyond said front wheel assembly and is of a multiple unit design and wherein the two outermost units (12,13) are tiltable.

13. The agricultural machine of claim 1 wherein said conveyor device (20) includes a conveyor belt (22).

14. The agricultural machine of claim 13 wherein said conveyor device (20) includes a conveyor tunnel (23) in which said conveyor belt (22) is disposed.

15. The agricultural machine of claim 14 and further comprising a storage space (24) disposed between said conveyor device (20) and said baling device (30).

16. The agricultural machine of claim 1 wherein said receiving device (10) is raised and lowered automatically in independence on the ground conditions.

17. The agricultural machine of claim 1 and further comprising a first power transmission device (50) interconnecting said engine and said baling device (30) and a second power transmission device (60) interconnecting said engine and said conveyor and receiving devices (20, 10), said second power transmission device (60) being connected in driven relation to said first power transmission device (50).

18. The agricultural machine of claim 17 wherein said second power transmission device (60) includes means for reversing the direction of conveyance of said conveyor device (20).

19. The agricultural machine of claim 1 wherein said front wheel unit includes a U-shaped frame with a pair of laterally spaced and downwardly extending legs (40), said conveyor device (20) being disposed between said legs (40) and said front wheels being mounted on the laterally outer sides of said legs (40).

20. The agricultural machine of claim 19 wherein said front wheel assembly (2) includes a hydraulic motor (41) mounting each of said wheels on said legs (40) and operable to drive its associated wheel.

21. The agricultural machine of claim 1 wherein said receiving device (10) is at least of a two-unit design and further comprising a drive for said receiving device (10) including drive elements extending along said conveyor device (20) to the two units of said receiving device.

22. The agricultural machine of claim 1 wherein said receiving device (10) includes a crop cutter.

23. The agricultural machine of claim 22 wherein said cutter is a rotary cutter.

24. The agricultural machine of claim 1 wherein said receiving device is a row-less corn head.

25. The agricultural machine of claim 1 and further comprising a transverse auger (21) disposed between said receiving device (10) and said conveyor device (20) and a feeding device driven by said internal combustion engine and disposed between said auger (21) and said conveyor device (20).

26. The agricultural machine of claim 25 wherein said feeding device is a rotary cylinder (14) arranged with its outer circumference close to the outer circumference to said auger (21).

27. The agricultural machine of claim 26 wherein said conveyor device (20) includes a conveyor belt (27) and wherein said rotary cylinder (14) extends over the width of said conveyor belt (27).

28. The agricultural machine of claim 27 wherein said conveyor device (20) includes a tunnel (26) in which said conveyor belt (27) is disposed and wherein said tunnel (26) includes a recess (18) in which said rotary cylinder (14) is disposed.

29. The agricultural machine of claim 28 wherein said rotary cylinder (14) is spring-loaded and movable to change the distance between the outer circumference of said rotary cylinder (14) and the outer circumference of said auger (21).

30. The agricultural machine of claim 26 wherein said rotary cylinder (14) includes deformable crossbars (46) on its circumference.

31. The agricultural machine of claim 26 wherein said rotary cylinder (14), said auger (21) and said conveying belt (27) are driven synchronously.

32. The agricultural machine of claim 1 and further comprising carrier elements (15) extending forwardly from said pick-up device (10) and a plurality of downholders (16) connected to said carrier elements (15).

33. The agricultural machine of claim 1 wherein said conveyor device (20) has a reorientation point (U) in an area above said transverse drive axle (70).

34. The agricultural machine of claim 33 wherein said conveyor device (20) has two conveyor belts (27, 27') each of which are guided over two longitudinally spaced guide rollers (28, 28') said belts (27, 27') being disposed in tandem in the longitudinal direction of said vehicle wherein the transfer of crop from the one conveyor belt (27) to the other conveyor belt (27') is in the area of said reorientation point (U).

35. The agricultural machine of claim 34 wherein said conveyor belt (27) adjacent said receiving device (10) is swingable about its rear guide roller.

36. The agricultural machine of claim 1 wherein said baling device (30) includes a flywheel and further comprising a first power transmission device driven by said engine (5) and having a power take off shaft (80) connected to said flywheel (79).

37. The agricultural machine of claim 36 and further comprising a second power transmission device connected to said power take off shaft and to said flywheel and a friction coupling (83) in the connection between said second transmission device and said flywheel.

38. The agricultural machine of claim 1 wherein said machine is designed to bale long-fiber materials including cardboard and paper.

* * * * *

UNITED STATES PATENT AND TRADEMARK OFFICE
CERTIFICATE OF CORRECTION

PATENT NO. : 5,752,374
DATED : May 19, 1998
INVENTOR(S) : Wilhelm von Allwörden and Dietrich Zaps It is certified that error appears in the above-indentified patent and that said Letters Patent is hereby corrected as shown below:

In item [73] on the cover page, cancel "Same S.p.A." and substitute --- SAME DEUTZ-FAHR S.p.A.---;

In claim 3, line 3, cancel "on" and substitute --- one --- and

In claim 34, line 4, insert a comma (,) before "said".

Signed and Sealed this

Third Day of November, 1998

Attest:

*Attesting Officer*

BRUCE LEHMAN
*Commissioner of Patents and Trademarks*